United States Patent [19]

Bonner et al.

[11] 4,259,689
[45] Mar. 31, 1981

[54] TELEVISION ADVERTISING EDITING SYSTEM

[76] Inventors: Edgar L. Bonner, 325 E. Main Ave., Taylorsville, N.C. 28681; Nelson A. Faerber, 900 Sixth Ave., South Naples on The Gulf, Fla. 33940

[21] Appl. No.: 38,378

[22] Filed: May 11, 1979

[51] Int. Cl.³ ............................................. H04N 5/48
[52] U.S. Cl. .................................... 358/165; 358/188
[58] Field of Search ............... 358/165, 181, 188, 193; 325/393, 395, 364, 478; 455/218, 229, 230, 231, 232, 234

[56] References Cited

U.S. PATENT DOCUMENTS

| | | | |
|---|---|---|---|
| 2,632,800 | 3/1953 | Schlesinger | 325/478 |
| 3,332,021 | 7/1967 | Hedlund | 325/395 |
| 3,337,805 | 8/1967 | Joseph | 325/393 |
| 3,378,775 | 4/1968 | Joseph | 325/393 |
| 3,541,453 | 11/1970 | Vanderpoel | 325/364 |
| 3,619,492 | 11/1971 | Evans | 358/165 |
| 3,843,929 | 10/1974 | Mayle | 325/393 |
| 3,940,701 | 2/1976 | Novitski | 325/393 |
| 3,975,688 | 8/1976 | Kroger | 325/393 |
| 4,047,226 | 9/1977 | Hedges | 358/165 |

OTHER PUBLICATIONS

"Commercial Killer Improves Programs" Radio–Electronics, Jun., 1950, p. 44.
"Commercial Break" p. A18 Washington Post 3-12-79.

Primary Examiner—Robert L. Griffin
Assistant Examiner—Michael A. Masinick
Attorney, Agent, or Firm—Blair, Brown & Kreten

[57] ABSTRACT

A television advertising editing system including a detector for sampling the video signal in a television set to charge a capacitor negatively during which the system is inactive but which permits the capacitor to be charged positively in the brief period wherein the video signal is interrupted between the television program material and commercial material for providing triggering output voltage which permits a relay, connected to the television audio output, to be energized either discontinuing or diminishing the audio output for a predetermined period of time.

10 Claims, 3 Drawing Figures

TELEVISION ADVERTISING EDITING SYSTEM

BACKGROUND OF THE INVENTION

A television set has become today a basic ingredient in everyday living and it is rare to find a home today which does not have at least one television set. With this wide audience available to television network companies and the attendant advertising revenue source, the use of commercial messages during the broadcasting of program material is increasing with greater and greater frequency so that a substantial portion of the entertainment program material is being preempted by commercial messages for advertising purposes. While the interruption of such program material for commercial material messages has always been somewhat disturbing to the viewing audience, the increase in preemption of time of the program material for advertising is beginning to bring about a strong adverse reaction by the viewing audience and a disillusionment or dissatisfaction with television in general. Very little has been done in the past to eliminate the disturbing aspects of commercial messages in television broadcasting since, to the broadcasting network, such a reduction in commercial messages would be accompanied by a loss of advertising revenue. On the other hand, the television viewer with a typical lack of skill in electronic matters can do very little to ameliorate the distasteful aspects of television advertising broadcasting. One such effort in the past, which has met with very little success, has been to use the increased sound volume accompanying a commercial message to trigger a suitable device for shutting off the set or for eliminating the sound. The only recourse left for the typical television viewer is simply to cut off the set or turn down the audio in the set manually or by some type of remote control, such an approach being highly inconvenient and seldom practiced.

OBJECTS AND SUMMARY OF THE INVENTION

Accordingly, a primary object of this invention is to provide a new and novel device for automatically controlling the audio output of a television set during the broadcasting of commercial messages on the set.

Another object of this invention is to provide a new and novel automatic television advertising editing system which responds immediately to the presentation of a commercial message on the set either to disconnect or to diminish the audio output of the set during the commercial message.

A further object of this invention is to provide a new and novel television advertising editing system which may be easily attached to any commercially available television set for diminishing or discontinuing the audio output of the set during commercial messages which is simple and inexpensive in construction and which utilizes a minimum of readily available commercial parts to instantaneously and without fail respond to the beginning of one or more commercial messages to remove the audio output from the set.

Still a further object of this invention is to provide a new and novel television advertising editing system in which the video signal in the set is utilized to interrupt the audio output from the set during a commercial message and which may be applied easily to both color and black and white television sets.

The objects of the invention and related objects are accomplished by the provision of relay means for controlling the audio output of a television set and video signal detecting means connected to the television set for receiving the video signal in the set together with means connected to the detecting means for monitoring the video signal received by the detecting means to provide an output voltage signal which indicates the absence of picture information in the video signal during the interval between the program material and commercial material. Voltage responsive means are connected to the relay means which respond to the output voltage signal indicating the absence of picture information in the video signal. The voltage responsive means being adapted to actuate the relay means and either diminish or discontinue the audio output for a predetermined period of time.

The objects stated above and other related objects and advantages of the invention will become apparent from the following description taken in connection with the accompanying drawings, in which:

DESCRIPTION OF THE PREFERRED EMBODIMENT

Figure 1:
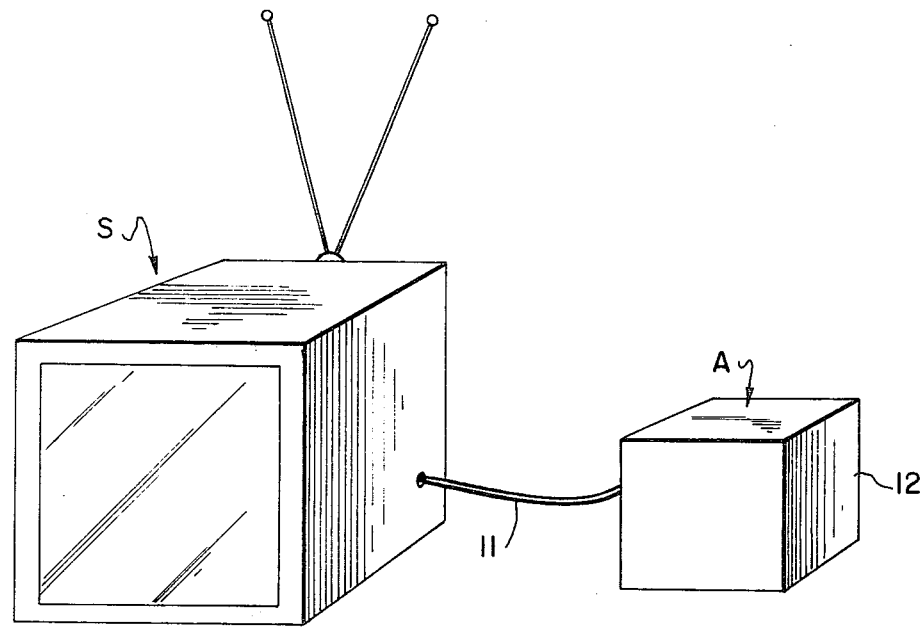
FIG. 1 is a perspective view showing the advertising editing system of the invention in connection with a television set of conventional construction.

Referring now to FIG. 1, there is shown a typical commercially available television set designated generally by the letter S which is arranged to be connected by means of conductors 11 to a unit designated generally by the letter A which is constructed in accordance with the invention. The unit A comprising the television advertising editing system of the invention is preferably enclosed in a suitable housing 12 and is arranged to be connected by means of the conductors 11 to that part of the circuit of the television set S at which the video signal from a broadcasting station appears. The television set S may be either of the black/white or color type and the connection by the conductors 11 may be made to either the cathodes or the grids of the set S depending on where the video signal is applied to the CRT tube of the set.

Figure 2:
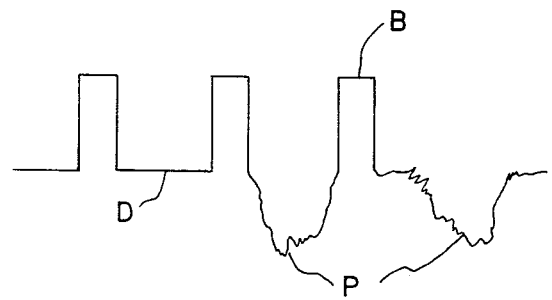
FIG. 2 is a diagram showing the wave shape of a typical video signal and the interruption between video signals for commercial messages used in the operation of the invention.

Referring now to FIG. 2, there is shown a typical video signal including picture information designated by the letter P. As is well known, just prior to the beginning of a commercial message, the video signal picture information P is interrupted for a brief moment indicated by a blanking pulse B during which period of time the video goes dark as indicated at D. This period of time during which the picture information P goes dark is about 0.3 seconds or somewhat greater and it is this interruption in the video picture information P which is utilized in the operation of the advertising editing system of the invention as will be explained hereinafter. It has been found that nearly every commercial message in television broadcasting is preceded by this brief period when the video picture information goes dark. The video signal shown in FIG. 2 is particularly for a black/white television set which has the video signal drive applied to the cathode of the CRT. However, it should be understood, that the principle of operation of the invention is the same whether the television set is a color set or a black/white set and whether the video signal was applied to the cathodes or the grids of the CRT. The presence of picture information P is indicated by an increase in the peak negative amplitude of the video signal as shown in FIG. 2. It should be understood that in television sets where the video signal is applied to the grid or grids of the CRT, the polarity of the input is reversed.

Figure 3:
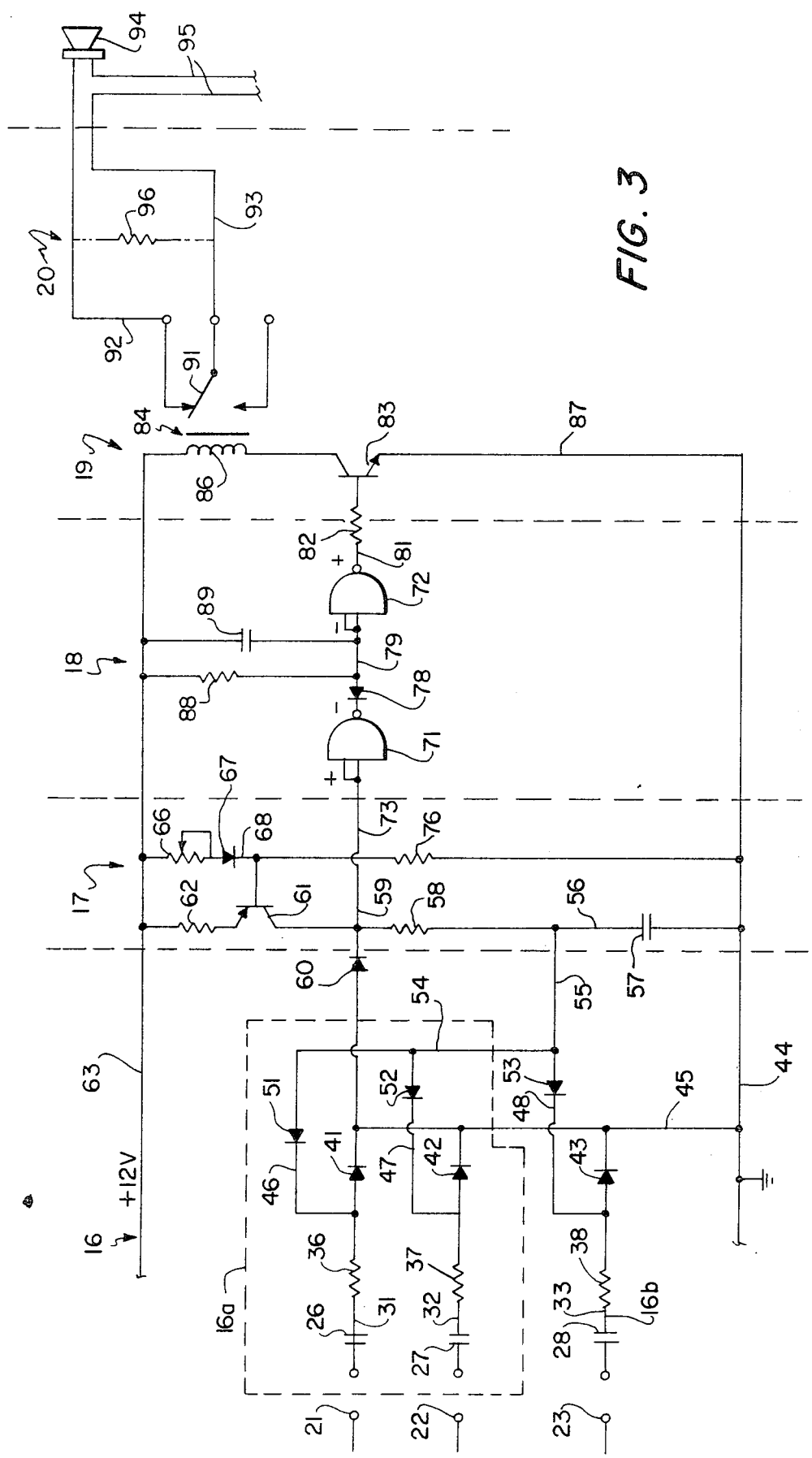
FIG. 3 is a schematic diagram of the circuit incorporated in the advertising editing system of the invention.

Referring now to FIG. 3, there is shown a circuit which forms the advertising editing system of the invention which includes video signal detecting means designated generally by the numeral 16, means for monitoring the video signal received by the detecting means designated generally by the numeral 17, voltage responsive means connected to the video signal monitoring means 17 and designated generally by the numeral 19 connected to the voltage responsive means 18 and to the audio output system of the television set designated generally by the numeral 20.

As shown in FIG. 3, a portion of the video signal detecting means enclosed in broken lines and designated 16a is utilized together with the other components of the detecting means 16 for color sets which as well known, utilizes three electron guns. However, the principle of operation is the same whether the circuit of FIG. 3 is utilized for either a black/white set or a color set. The portion 16b only is used for a black/white set. In the description to follow, the video signal detecting means 16 will be described in relation to a color television set utilizing both portions 16a, 16b.

The video signal detecting means 16 in the circuit of FIG. 1 is connected to three terminals 21 through 23 in the television set in the well known manner at which the video signal appears in a color set and the video signal is coupled to the detecting means 16 by capacitors 26, 27, 28 in conductors 31, 32 33 respectively. As explained above, the connection to conductor terminals 21, 22, 23 is to the cathodes or grids of the television set depending on where the video signal is applied to the CRT and there are three connections for a color television set and one for a black/white set. The video signals are isolated from the DC voltage in the video signal by the capacitors 26, 27, 28 and resistors 36, 37, 38 are provided in the conductors 31, 32, 33 for isolating the detecting means 16 and to prevent loading of the video signal. From the resistors 36, 37, 38, the conductors 31, 32, 33 are connected to the anodes of diodes 41, 42, 43 respectively the cathodes of which are connected to ground 44 by a common conductor 45. The diodes 41, 42, 43 clamp the positive cycle of the video signal to the ground and thus form a negative reference voltage on the capacitors 26, 27, 28 respectively.

The conductors 31, 32, 33 are also connected between resistors 36, 37, 38 and diodes 41, 42, 43 through conductors 46, 47, 48 to the cathodes of diodes 51, 52, 53 respectively the anodes of which are connected together by a conductor 54 connected in turn by conductor 55 to conductor 56.

Conductor 56 is connected to one side of a control capacitor 57 in the monitoring means 17, the other side of capacitor 57 being connected to ground 44. Conductor 56 is also connected to one side of a resistor 58, the other side of which is connected to conductor 59 to which the cathode of a diode 60 is connected. The anode of diode 60 is connected to the common conductor 45 and the junction point of conductors 56 and 59 is connected to the collector of a transistor 61 having its emitter connected through a resistor 62 to a source of positive DC voltage preferably, 12 volts DC by conductor 63. Thus, capacitor 57 is negatively charged by the DC voltage on conductor 56 and if the negative cycles of the video signal exceed the negative charge already on capacitor 57, diodes 51, 52, 53 conduct. When diodes 51, 52, 53 conduct, the result is a net negative charge on control capacitor 57 which varies with the amplitude of the video signal. Control capacitor 57 is discharged through resistor 58 and transistor 61.

Transistor 61 is a constant circuit source having an output passing through resistor 58 to discharge capacitor 57. As current through resistor 58 is constant, the voltage across resistor 58 is constant. Therefore, changes in the voltage across control capacitor 57 appear at the collector of transistor 61 as long as transistor 61 is not saturation and as long as diode 60 does not conduct. A potentiometer 66 is provided in the circuit of FIG. 3, one side of which is connected to the positive power supply conductor 63 and the other side to the anode of a diode 67. The cathode of diode 67 is connected by means of conductor 68 to the base of transistor 61. Therefore, potentiometer 66 serves as a sensitivity control by setting a predetermined tripping voltage across control capacitor 57.

The voltage responsive means 18 of the invention which is connected to the monitoring means 17 include at least one and preferably two control gates 71, 72 which are preferably Schmitt trigger gates. Gate 71 serves as a threshold detector and has an input connected by means of conductor 73 to conductor 56 at the junction of transistor 61, diode 60 and resistor 58. It is the setting on the potentiometer 66 which determines the voltage across control capacitor 57 which will trip the Schmitt trigger gate 71. It can be seen that the cathode of diode 67 connected to the potentiometer 66 is connected by conductor 68 through resistor 76 to ground 44.

In the circuit of FIG. 3, the Schmitt trigger gate 71 serves as a threshold detector such that when the picture information in the video signal disappears, as explained above, control capacitor 57 charges positive so that the input on conductor 73 to gate 71 goes positive to output a negative signal. The output of gate 71 is connected to the cathode of a diode 78, the anode of which is connected by conductor 79 to the input of the second control gate 72 also preferably the Schmitt trigger gate. The output of gate 72 is connected by conductor 81 through resistor 82 to the base of a control transistor 83 in the relay means 19. The relay means 19 includes a relay 84 having a coil 86 connected at one side to the collector of transistor 83, the emitter of which is connected by conductor 87 to ground at 44. The other side of relay coil 86 is connected to the positive power supply conductor 63.

Conductor 79 between the gates 71, 72 is connected through a resistor 88 to the positive power supply conductor 63 and through a capacitor 89 to the power conductor 63 also.

As explained above, when control capacitor 57 is charged positive by the disappearance of the video signal, the input to control gate 71 goes positive and the output of control gate 71 goes negative. When the output of control gate 71 is driven negative, diode 78 conduct to ground and charges capacitor 89 so that the input to gate 72 goes negative. When the input of gate 72 is negative, the output is positive to fire transistor 83 so that transistor 83 conducts and current flows through the relay coil 86. Relay 84 includes a double pole, single throw switch 91 which in the deenergized condition of the coil 86 moves into the solid line position of FIG. 3 to complete a circuit through conductors 92 and 93 to the audio output speaker 94 of the television set S connected in the well known manner by conductors 95 to the internal audio amplifier. When transistor 83 conducts, relay coil 86 is energized and the switch 91 moves from the solid line to the dotted line position disconnecting the speaker 94 and eliminating the audio from the television set. If a diminished sound level is desired, a resistor 96 is connected across conductors 92, 93, so that when the relay 84 is actuated the audio from speaker 94 is diminished rather than discontinued.

Transistor 83 will continue to conduct as long as the input to gate 72 is below the threshold level. The time during which the input of control gate 72 remains below the threshold level is determined by the discharge of capacitor 89 through resistor 88 and preferably this time is set to about 35 to 40 seconds. Capacitor 89 is recharged if during this time, the detecting means 16 detects another interruption in the picture information. Otherwise, the circuit of the invention deactivates the relay 84 and releases the audio control at the end of the time period.

Having thus described the preferred embodiment of the invention it should be understood that numerous structural modifications and adaptations may be resorted to without departing from the spirit of the invention.

What is claimed is:

1. A television advertising editing system comprising, in combination, control means for controlling the audio output of a television set, video signal detecting means, means for connecting said video signal detecting means to a video circuit of said television set for receiving the video signal in said television set, monitoring means coupled to said video signal detecting means for monitoring the video signal received by said video signal detecting means to provide an output voltage signal indicating the absence of picture information in the video signal during the interval between program material and commercial material, voltage responsive means coupled between said control means and said monitoring means and responsive to the output voltage signal to actuate said control means for controlling the audio output of the television set.

2. A television advertising editing system in accordance with claim 1 including timing means connected to said voltage responsive means for maintaining the actuation of said control means by said voltage responsive means for a predetermined period of time.

3. A television advertising editing system in accordance with claim 1 wherein said control means is adapted to discontinue said television audio output.

4. A television advertising editing system in accordance with claim 1 wherein said control means is adapted to diminish said television audio output.

5. A television advertising editing system in accordance with claim 2 wherein said monitoring means includes a control capacitor connected to associated source of DC power and means for charging said capacitor with the video signal from said detector means whereby the charge on said capacitor varies with the amplitude of said video signal, said voltage responsive means being arranged to respond to the charge on said control capacitor corresponding to the absence of picture information in the video signal from said detector means to actuate said relay means.

6. A television advertising editing system in accordance with claim 5 including means for adjusting the voltage level across said control capacitor to select the output voltage signal at which said voltage responsive means will respond.

7. A television advertising editing system in accordance with claim 5 wherein said voltage responsive means include a pair of control gates, means for connecting the input of one of said control gates to said monitoring means, means for connecting the output of said one control gate to the input of the other of said control gates, and means for connecting the output of said other control gate to said control means.

8. A television advertising editing system in accordance with claim 7 wherein said control gates comprises Schmitt trigger gates.

9. A television advertising editing system in accordance with claim 7 wherein said means for connecting the output of said one control gate to the input of said other control gate include a diode and wherein said timing means are connected between said connecting means for said control gates and said associated source of DC power.

10. A television advertising editing system in accordance with claim 9 wherein said timing means comprises a resistor and a capacitor connected in parallel between said control gates connecting means and said associated source of DC power.

* * * * *